Patented Feb. 28, 1933

1,899,042

UNITED STATES PATENT OFFICE

WILLIAM M. MALISOFF, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA

HYDROCARBON OIL REFINING

No Drawing.   Application filed December 10, 1930.   Serial No. 501,475.

The present invention relates to the art of refining hydrocarbon oils, and more particularly to a process for the removal of sulfur therefrom.

Although my process is applicable to the treatment of hydrocarbon oils in general, it is particularly suitable for removing sulfur from petroleum and its products.

Many hydrocarbon oils contain appreciable amounts of sulfur combined with hydrocarbons in the form of organic disulfides, either naturally occurring or as the result of chemical treatment of the oil. A primary object of the present invention is to effect the removal of these disulfides and other sulfur compounds from hydrocarbon oils. It is also my object to remove the disulfides contained in a hydrocarbon oil without incurring the disadvantages incident to prior processes for affecting the sulfur content of hydrocarbon oils.

The basis of my invention is my discovery that sulfur compounds such as those of the type described may be removed from hydrocarbon oils by washing the sulfur-containing oil with a solution of a reducing agent in an organic solvent for the reaction product of the reducing agent and the sulfur compounds contained in the oil.

The reducing agents particularly desirable for use in my process are the alkali sulfides, including ammonium sulfide, and use of the term "reducing agent" hereinafter, and in the appended claims will be intended to include one or a mixture of two or more of the substances described or their equivalents. For example, the use of hydrosulfides as a substitute for the sulfides as above mentioned is considered as obvious equivalents.

The function of the organic solvent used in my process is to carry the reducing agent in solution and to exert a preferential solubility for reaction products of the reducing agent and the sulfur compounds contained in the oil. As suitable solvents operable in this manner I may use members from the groups comprising: monohydric alcohols, polyhydric alcohols, ketones, and halogen hydrins. More specifically, I have found it desirable to employ methyl, ethyl, propyl, and isopropyl alcohols; glycols and glycerine; acetone, ethyl methyl ketone, diethyl ketone; and epichlorhydrin. Of these solvents, methyl alcohol, ethyl alcohol, glycol, and glycerine are of particular utility. The term "organic solvent" is used herein and in the appended claims to designate one or a mixture of two or more of the solvents above mentioned or their equivalents.

To carry out my process, a treating solution is prepared by dissolving a reducing agent in one or more of the organic solvents indicated. The sulfur-containing oil is then subjected to one or more washes with the treating solution so prepared, and after separation of the treating solution from the oil, the content of sulfur compounds in the oil is found to be materially reduced.

While I do not intend being limited thereby, it is my theory that the reducing agents indicated herein react with organic disulfides and other sulfur compounds to form mercaptides or other compounds which are preferentially soluble in the organic solvent employed. Regardless of theory, I have found that washing an oil with a solution of a reducing agent in an organic solvent results in a material reduction in the sulfur content of the oil.

As the reaction products of my reducing agents and the sulfur compounds contained in the oil are preferentially soluble in the organic solvent employed, final removal of the sulfur compounds depends upon separation of the treating solution from the oil. Some of the organic solvents heretofore mentioned are somewhat miscible with hydrocarbon oils even when containing a reducing agent in solution, and for this reason, it is necessary to add an immiscible rendering substance to the treating solution before separation of the latter from the oil may be effected. As suitable immiscible rendering agents, I may employ water, inorganic salts, or even organic compounds such as urea. This addition of an immiscible rendering substance may be made after mixing the oil with the treating solution, but I prefer to render the treating solution immiscible with the oil prior to their intermixture.

The presence of an undue amount of water in my treating solution causes the hydrolysis of the sulfur compounds preferentially dissolved in the treating solution, thus defeating the purpose of my invention by the formation of mercaptans which are preferentially soluble in the oil. For this reason it is desirable to confine the water content of my treating solution to the amount necessary to render the latter immiscible with the oil. While good results may be obtained with a treating solution containing 15% or more water, it is preferred to limit the water content to substantially 10% or less.

A preferred treating solution comprises a solution of an alkali sulfide in methyl alcohol. Anhydrous methyl alcohol is somewhat miscible with oil, and it is preferred to employ the alcohol in admixture with sufficient water to render the treating solution immiscible with the oil. For this purpose 90% alcohol is satisfactory.

It is generally desirable to subject the sulfur-containing oil to repeated washings with fresh portions of my treating solution. After each wash the mixture of oil and treating solution is allowed to settle, and the treating solution separates from the oil to form a well defined lower layer which may be drained from the supernatant oil. This layer is found to contain the organic solvent, unexpended portions of the reducing agent, dissolved sulfur compounds, a small amount of oil, and a certain amount of tarry material which is probably formed by side reactions. The process may be made continuous, for example, by passing the sulfur-containing oil in counter current contact with the immiscible treating solution or by other well known means.

In addition to sulfur compounds which react with my reducing agent many oils contain an appreciable content of mercaptans which impart a disagreeable odor thereto. An oil of this nature may be advantageously treated by subjecting it to one or more washings with my treating solution prepared as heretofore described to which an alkaline substance is added. As the alkaline component I may use an alkali hydroxide, including ammonia, alkoxides of the alkali or alkaline earth metals, onium bases, equivalent alkaline substances, or mixtures of two or more of these various materials. As described in my copending application, Serial No. 493,064, the alkaline substance acts to convert the mercaptans contained in the oil to mercaptides which are preferentially soluble in the organic solvent, being removed from the oil simultaneously with the removal of sulfur compounds which react with the reducing agent.

What I claim is:

1. A process for removing sulfur from hydrocarbon oils, which comprises washing the sulfur-containing oil with a solution of an alkali sulfide in at least one solvent from the group comprising methyl alcohol, ethyl alcohol, propyl alcohol, isopropyl alcohol, glycol, glycerine, acetone, ethyl methyl ketone, diethyl ketone, and epichlorhydrin, and separating said solution from the oil.

2. A process for removing sulfur from hydrocarbon oils, which comprises washing the sulfur-containing oil with a solution of an alkali sulfide in methyl alcohol, and separating the solution from the oil.

3. A process for removing sulfur from hydrocarbon oils, which comprises washing the sulfur-containing oil with a solution of an alkali sulfide in methyl alcohol, said solution containing a sufficient amount of water to inhibit the mutual solubility of the oil and solution, and separating said solution from the oil.

4. A process for removing sulfur from hydrocarbon oils, which comprises subjecting the sulfur-containing oil to repeated washings with an alkali sulfide dissolved in methyl alcohol, and separating the solution from the oil after each wash.

5. A process for removing sulfur from hydrocarbon oils, which comprises washing the sulfur-containing oil with a solution of an alkaline sulfide and an alkaline hydroxide in at least one solvent from the group comprising methyl alcohol, ethyl alcohol, propyl alcohol, isopropyl alcohol, glycol, glycerine, acetone, ethyl methyl ketone, diethyl ketone, and epichlorhydrin, and separating said solution from the oil.

6. A process for removing sulfur from hydrocarbon oils, which comprises washing the sulfur-containing oil with a solution of an alkali hydroxide and an alkali sulfide in methyl alcohol, and separating said solution from the oil.

In testimony whereof I affix my signature.

WILLIAM M. MALISOFF.